US008452531B2

(12) United States Patent
Lo

(10) Patent No.: US 8,452,531 B2
(45) Date of Patent: May 28, 2013

(54) ROUTE GUIDING SYSTEM AND METHOD THEREOF

(75) Inventor: Wei-Yi Lo, Kuei San Hsiang (TW)

(73) Assignee: MiTAC International Corp., Kuei San Hsiang (TW)

( * ) Notice: Subject to any disclaimer, the term of this patent is extended or adjusted under 35 U.S.C. 154(b) by 726 days.

(21) Appl. No.: 12/550,370

(22) Filed: Aug. 29, 2009

(65) Prior Publication Data

US 2010/0198507 A1 Aug. 5, 2010

(30) Foreign Application Priority Data

Feb. 4, 2009 (TW) .............................. 98103560 A

(51) Int. Cl.
*G01C 21/34* (2006.01)
*G01C 21/36* (2006.01)

(52) U.S. Cl.
CPC ................................ *G01C 21/3682* (2013.01)
USPC .... 701/416; 701/426; 340/995.2; 340/995.27

(58) Field of Classification Search
USPC ........................................................ 701/209
See application file for complete search history.

(56) References Cited

U.S. PATENT DOCUMENTS

| | | | | |
|---|---|---|---|---|
| 4,939,662 A | * | 7/1990 | Nimura et al. ................ | 701/437 |
| 6,542,814 B2 | * | 4/2003 | Polidi et al. .................. | 701/454 |
| 7,839,306 B2 | * | 11/2010 | Tanizaki et al. ............ | 340/995.1 |
| 2002/0065604 A1 | * | 5/2002 | Sekiyama ..................... | 701/209 |
| 2002/0138196 A1 | * | 9/2002 | Polidi et al. .................. | 701/208 |
| 2004/0260464 A1 | * | 12/2004 | Wong .......................... | 701/209 |
| 2006/0220923 A1 | * | 10/2006 | Tanizaki et al. ............ | 340/995.1 |
| 2007/0078596 A1 | * | 4/2007 | Grace .......................... | 701/209 |
| 2007/0219706 A1 | * | 9/2007 | Sheynblat .................... | 701/200 |
| 2008/0167798 A1 | * | 7/2008 | Tertoolen ..................... | 701/200 |
| 2009/0018766 A1 | * | 1/2009 | Chen et al. .................. | 701/202 |
| 2009/0091439 A1 | * | 4/2009 | Sekiyama et al. ........... | 340/459 |

FOREIGN PATENT DOCUMENTS

| | | |
|---|---|---|
| CN | 101270998 A | 9/2008 |
| CN | 101319904 A | 12/2008 |
| CN | 101319907 A | 12/2008 |
| CN | 101358853 A | 2/2009 |
| JP | 2002333337 A * | 11/2002 |

* cited by examiner

*Primary Examiner* — Shelley Chen
(74) *Attorney, Agent, or Firm* — Wang Law Firm, Inc.; Li K. Wang; Stephen Hsu

(57) ABSTRACT

The present invention discloses a route guiding system and a method thereof. The route guiding system in accordance with the present invention determines whether a user is approaching a crossway point based on the user's current position. In case the user is determined to approach a crossway point, other crossway points having a road connecting to this crossway point and scenic spots along such crossway points are searched from the electronic map. Finally, such roads connecting to these crossway points and relevant information concerning these scenic spots are displayed. In this fashion, the user can move randomly for promenade along the streets according to the scenic spot information displayed on the route guiding system without specifically setting any destination.

14 Claims, 6 Drawing Sheets

ROUTE GUIDING SYSTEM AND METHOD THEREOF

BACKGROUND OF THE INVENTION

1. Field of the Invention

The present invention generally relates to a route guiding system and a method thereof, and in particular to the technical field of a route guiding operation without specifically setting destinations by users.

2. Description of Related Art

Navigation devices are widely applied in vehicle electronic devices and handheld devices nowadays. Users can utilize the navigation device to schedule an optimal driving route and to move on and arrive at the destination in accordance with the navigation messages provided by the navigation device. However, the navigation mode in a conventional navigation device still requires entering specific destinations to enable navigation function, but users may occasionally have no specific target in mind for their itineraries when using the navigation device and perhaps simply intends to move or drive around for recreational purposes based on the electronic map and scenic spot information stored in the navigation device. Therefore, in absence of destination inputs, the conventional navigation device will display all electronic maps and scenic spot information, forcing users to select the scenic spot they actually intend to visit among various complicated screens.

SUMMARY OF THE INVENTION

With regard to the aforementioned drawbacks found in the prior art, one objective of the present invention is to provide a route guiding system and a method thereof, so as to enable a navigation mode requiring no destination inputs and to increase more route guiding selections.

According to one objective of the present invention, a route guiding system is herein proposed for guiding a user to select a movement path. The route guiding system comprises a display module, a data storage module, a positioning module, a crossway point determining module and a process module. The data storage module may store an electronic map and data concerning a plurality of scenic spots, in which the electronic map comprises data for a plurality of roads as well as a plurality of crossway points located between the plurality of roads. The positioning module may provide position data of the user. The crossway point determining module may determine whether the user is approaching a first crossway point among the plurality of crossway points based on the provided position data and the electronic map. In case the user is determined as getting near to the first crossway point, the crossway point determining module determines at least one second crossway point having a road connecting to the first crossway point. Next, the process module may search for the scenic spots located between the first crossway point and at least one second crossway point from the data storage module, and may drive the display module to display the first crossway point, the roads between the first crossway point and at least one second crossway point as well as relevant information about the scenic spots found from the search results.

Herein the route guiding system may further comprise an input module used to allow entering properties of scenic spots to be displayed, and the process module may perform searches based on the inputted properties of scenic spots.

Herein the relevant information concerning the scenic spots obtained from the searches may comprise the number of scenic spots obtained thereby.

Herein the process module may determine the scenic spot the user is approaching according to the position data, and then generate a prompt signal comprising the data for the scenic spot to which the user is approaching.

According to another objective of the present invention, a route guiding method is herein proposed for guiding a user to select the movement path, which route guiding method comprising the following steps. Initially, an electronic map and data concerning a plurality of scenic spots are provided. Position data of the user are acquired by using a positioning module, then determining whether the user is approaching a first crossway point in the electronic map. When the user is determined to approach the first crossway point, at least one second crossway point having a road connecting to the first crossway point is determined based on the electronic map, further searching for the scenic spots located between the first crossway point and the at least one second crossway point, and then displaying the first crossway point, the roads between the first crossway point and the at least one second crossway point as well as relevant information about the scenic spots acquired from the search results.

Herein the route guiding method may further comprise the step of allowing the user to enter properties of scenic spots to be displayed and performing searches based on the inputted properties of scenic spots.

Herein the relevant information concerning the scenic spots acquired from the searches may comprise the number of scenic spots obtained thereby.

Herein the route guiding method may further comprise the step of determining the scenic spot the user is approaching according to the position data and generating a prompt signal comprising the data for the scenic spot to which the user is approaching.

DETAILED DESCRIPTION OF THE PREFERRED EMBODIMENTS

Figure 1:
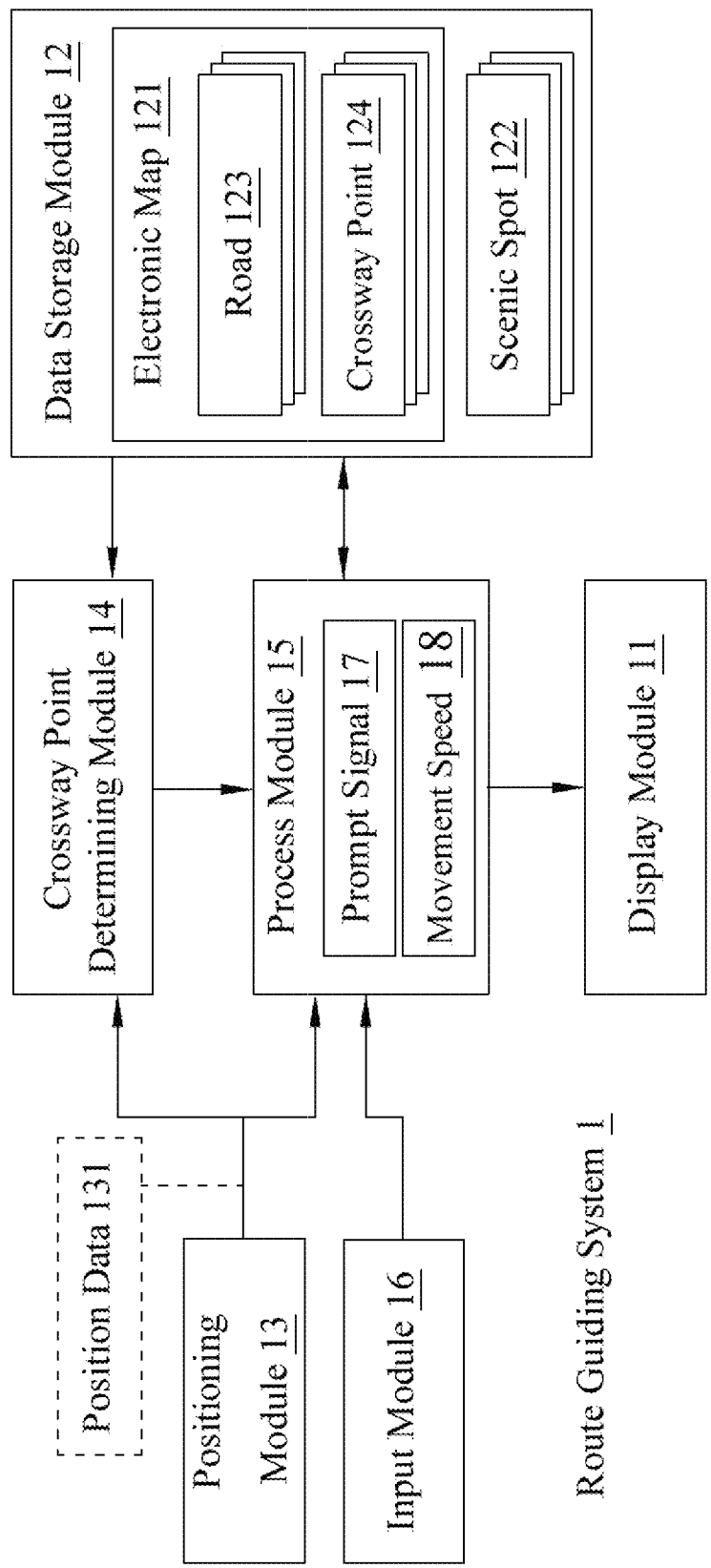
FIG. 1 is a block diagram of the route guiding system in accordance with an embodiment of the present invention.

Referring to FIGS. 1, 2, 3 and 4, wherein a block diagram of the route guiding system in accordance with an embodiment of the present invention, a first display interface example, a second display interface example and a third display interface example thereof are respectively shown. In those Figures, the route guiding system 1 may comprise a display module 11, a data storage module 12, a positioning module 13, a crossway point determining module 14, a process module 15 and an input module 16. The data storage module 12 may store an electronic map 121 and data for a plurality of scenic spots 122, in which the electronic map 121 may comprise data for a plurality of roads 123 and a plurality of crossway points 124 between the plurality of roads 123. The crossway points 124 may indicate the locations where roads mutually intersect or join. The data storage module 12 may be a CD drive. Flash memory or hard disc drive. The positioning module 13 may provide position data 131 of the user and is preferably a Global Positioning System (GPS) module, an electronic compass or a gyroscope. The position data 131 preferably comprises longitudinal and latitudinal coordinates of the user.

Figure 2:
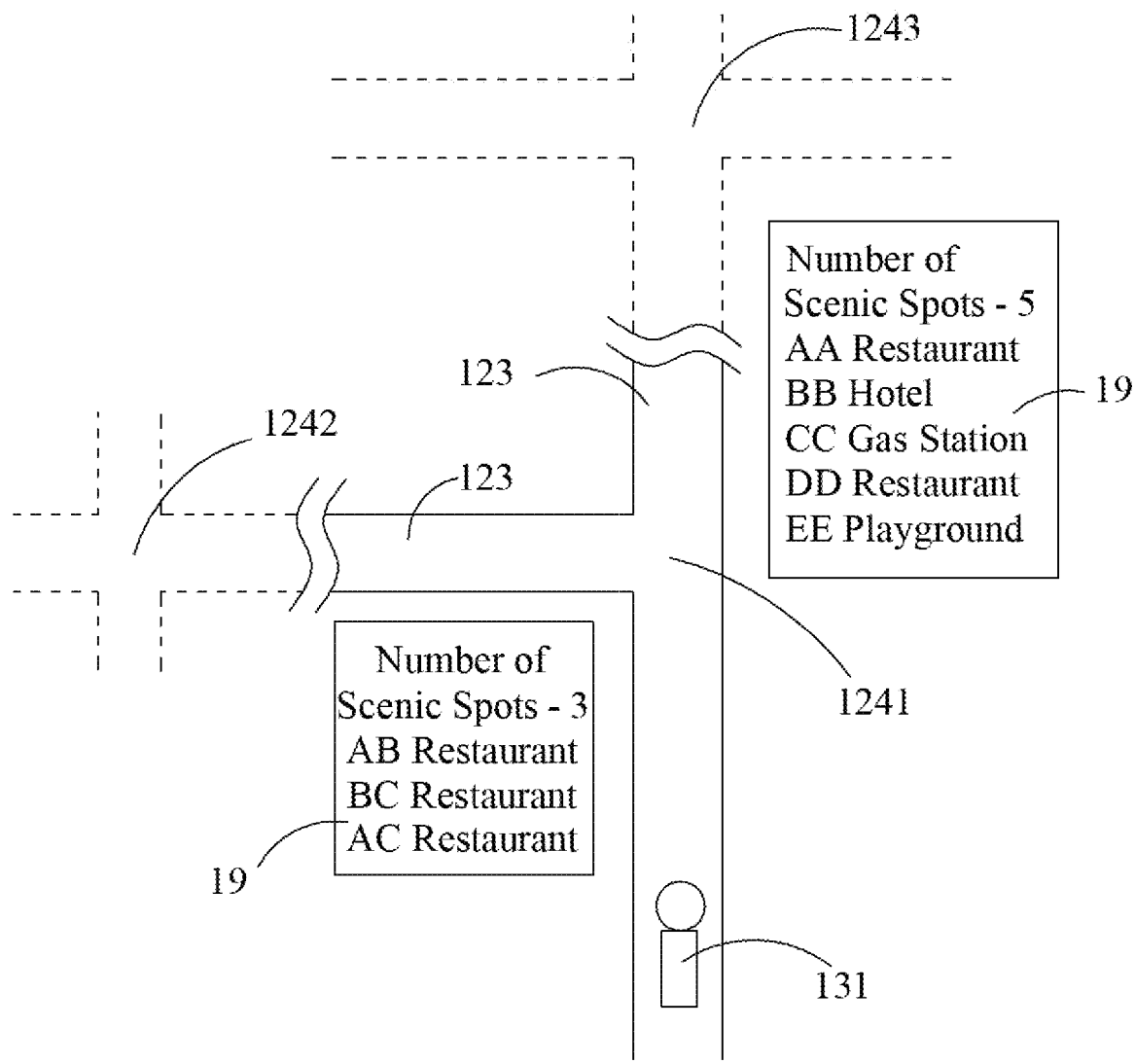
FIG. 2 is a first display interface example of the route guiding system in accordance with the present invention.

The crossway point determining module 14 may determine whether the user is approaching any one of the plurality of crossway points 124 based on the position data 131 and the electronic map 121. If the user is determined to be'not approaching any crossway point, e.g. the distance between the position data 131 of the user and positions of all such crossway points is greater than a preset distance value, then the crossway point determining module 14 continues to receive the position data 131 from the positioning module 13 and to engage in determination. On the other hand, when the crossway point determining module 14 calculates that the distance between the position data 131 of the user and one crossway point 124 is less than the preset distance value, the user is determined as approaching the crossway point 124, e.g. the user is approaching to a first crossway point 1241 as shown in FIG. 2. Subsequently, the crossway point determining module 14 may determine the at least one crossway point having a road 123 connected to the first crossway point 1241, as the second crossway point 1242 and the second crossway point 1243 shown in the FIG. 2. Since the user did not previously set any destination as the route guiding system 1 started, the route guiding system 1 is unable to calculate a preferred guide route. Therefore, through determination upon the second crossway point 1242, it allows the user to further select relevant information concerning the target to head for.

Sequentially, the process module 15 may search on the data storage module 12 and find out the scenic spots 122 located between the first crossway point 1241 and the second crossway point 1242, 1243, e.g. AA restaurant, BB hotel, CC gas station, DD restaurant, EE playground, AB restaurant, BC restaurant shown in the FIG. 2. The scenic spots 122 found by process module 15 indicate the scenic spots that the user may pass by as moving from the first crossway point 1241 to the second crossway point 1242 or 1243. Next, the display module 11 is driven to display at least the first crossway point 1241, the roads between the first crossway point 1241 and at least one of the second crossway points 1242, 1243, as well as relevant information 19 for the located scenic spots 122. The relevant information for these scenic spots may comprise the number of scenic spots found in the process, or data concerning such scenic spots.

In case that the data for such scenic spots further comprise names, properties (e.g. restaurant, gas station, school or entertainment sites) or levels (such as grand, general or small in size), the user is allowed to enter the scenic spot property intended to be displayed through the input module 16, and the process module 15 performs search operations based on the scenic spot property inputted by the user. For example, suppose the user wants to find a restaurant for a meal but has not yet decided which restaurant to go to, then he/she may set "Restaurant" as the scenic spot property intended to be displayed. When the user approaches the first crossway point 1241, there exist two route options, one for the second crossway point 1242, and the other for the second crossway point 1243. In order to facilitate better understanding of the the more appropriate option, the route guiding system 1 respectively shows the number of restaurants, or information thereof, located between the first crossway point 1241 and the second crossway point 1242, 1243. Then, the user may select to move along the route where more restaurants can be found, or otherwise to browse the restaurant information for selecting the restaurant he/she personally adores.

Figure 3:
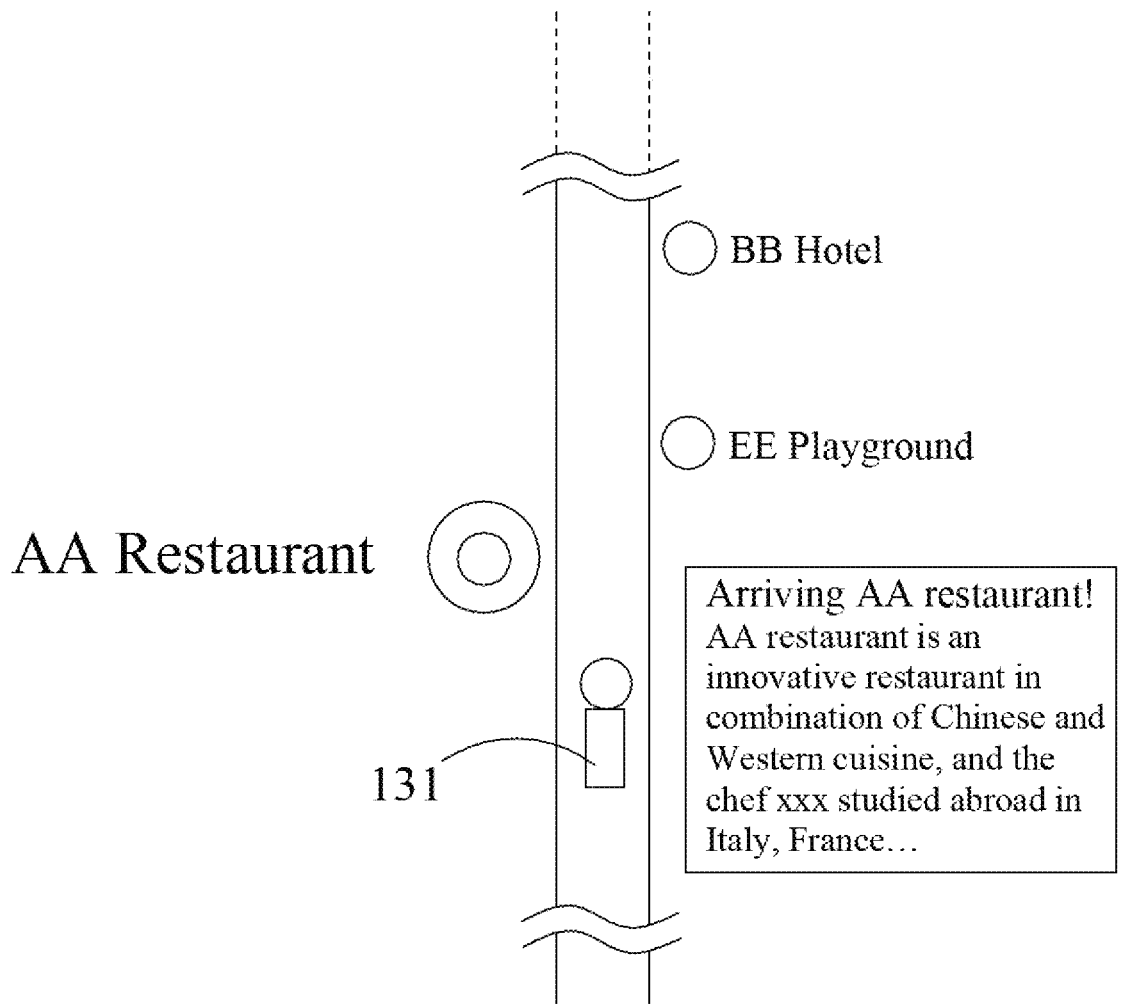
FIG. 3 is a second display interface example of the route guiding system in accordance with the present invention.

Besides, the process module 15 may, as required, determine the scenic spots 122 to which the user is approaching based on the position data 131, and generate a prompt signal 17 comprising the data about such scenic spots 122 around the user, as shown in FIG. 3, or furthermore such scenic spots 122 can be highlighted e.g. by different foreground/background colors or in various font sizes etc. The prompt signal 17 can be displayed as marquees on the display module or rendered in audio fashion, thereby enhancing the aliveness of route guiding operations for the user. The process module 15 can also generate a corresponding prompt signal 17 as the user is getting near to the crossway point.

Figure 4:
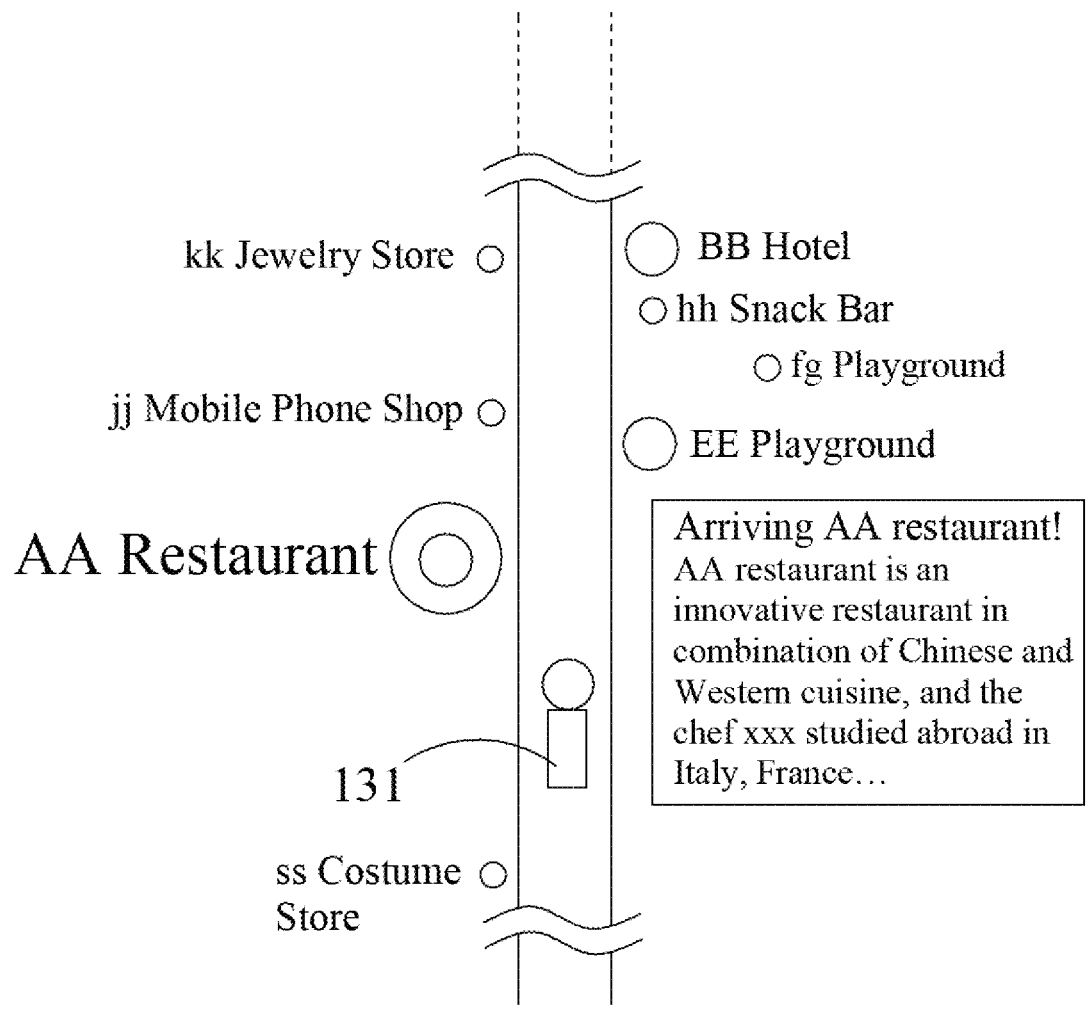
FIG. 4 is a third display interface example of the route guiding system in accordance with the present invention.

In addition, the process module 15 can optionally record the position data 131 and calculate the movement speed 18 of the user according to the recorded position data 131, thereby determining the number of scenic spots to be displayed based on the movement speed 18 of the user. For example, in case the scenic spots 122 are classified as different levels, in order to avoid the risk of excessive amount of information complicating the guide screen, the process module 15 may initially search simply on the scenic spots having higher levels, such as restaurants of bigger service sites or international chain restaurants. When the process module 15 determines that the user's movement speed is reduced, indicating the user might be interested in a certain nearby scenic spot, the process module 15 thus gradually narrows down the search to scenic spots of lower levels, allowing clearer perspective on local scenic spots, as shown in FIG. 4. The differences between FIG. 4 and FIG. 3 lie in that there additionally, in FIG. 4, show certain scenic spots of lower levels such as hh snack bar, kk jewelry store, jj mobile phone shop, fg playground and ss costume store and so forth.

Furthermore, the process module 15 can optionally record the road 123 each time chosen by the user to move along, and predict the destination of the user in accordance with the road 123 chosen by the user, thereby further providing more advanced information such as meteorological information, traffic information around the predicted destination or miscellaneous activity information and the like.

Figure 5:
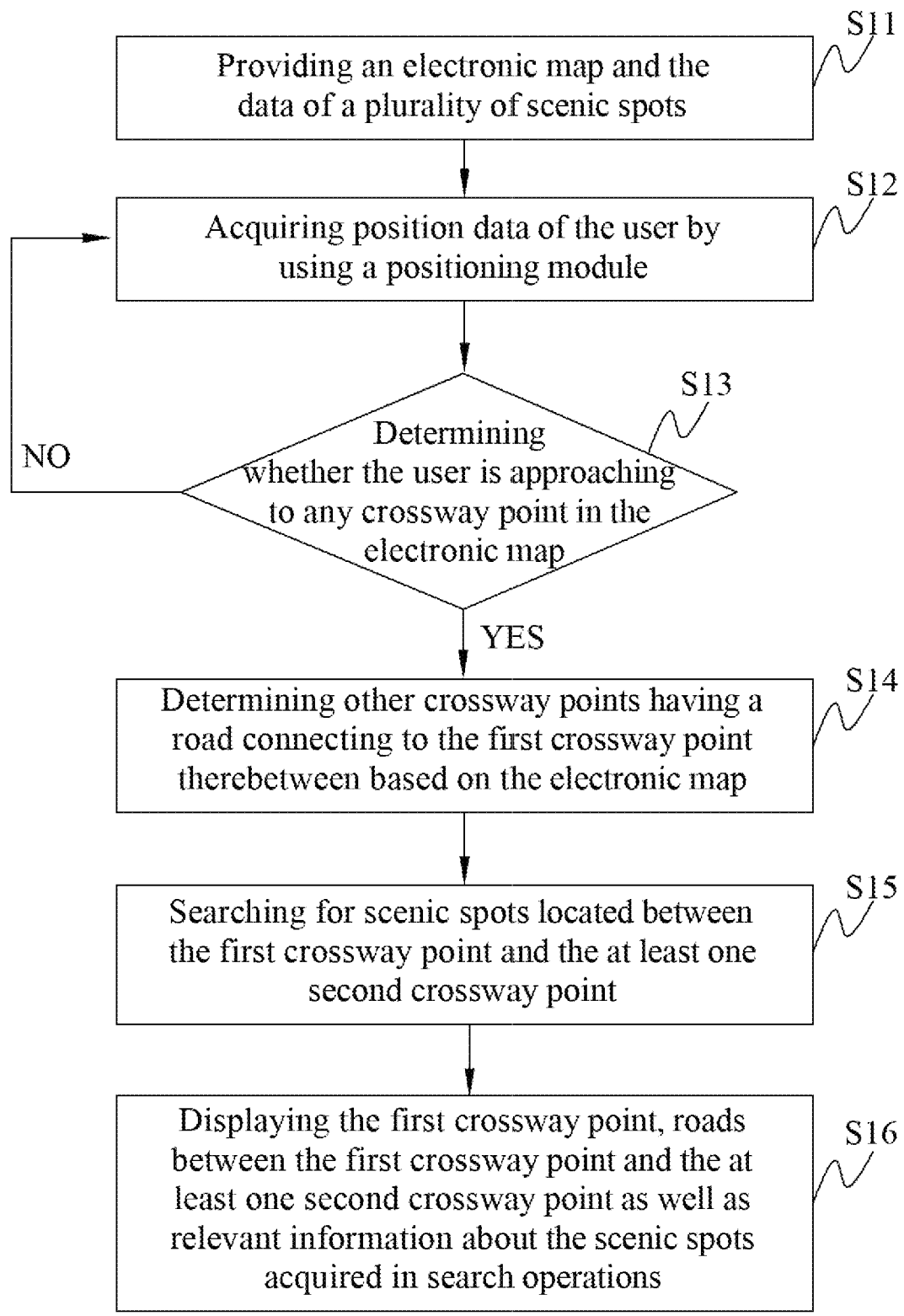
FIG. 5 is a flowchart of the route guiding method in accordance with an embodiment of the present invention.

Referring to FIG. 5, a flowchart of the route guiding method in accordance with an embodiment of the present invention is shown. In the Figure, the illustrated route guiding method is about to guiding a user to select movement path without inputting a destination, comprising the following steps. In STEP S11, an electronic map and the data of a plurality of scenic spots are provided. Such data can be accessed from a CD drive, a Flash memory or a hard disc drive. The data of scenic spots may comprise name, property and level of the scenic spot.

Next, in STEP S12, position data of the user is acquired by using a positioning module. The positioning module is preferably a Global Positioning System (GPS) module, an electronic compass or a gyroscope, while the position data preferably comprises longitudinal and latitudinal coordinates of the user position.

In STEP S13, whether the user is approaching any crossway point in the electronic map is determined. In case that the user is deemed as not moving toward any crossway point, the process returns to STEP S12;

Suppose the user is deemed as moving toward one of the crossway points in the electronic map, hereinafter referred as the first crossway point, then in STEP S14, determining other crossway points having a road connected to the first crossway point therebetween based on the electronic map, hereinafter referred as the second crossway points. The second crossway points found in such searches indicate the targets to which the user can selectively move forward.

In STEP S15, the scenic spots located between the first crossway point and the at least one second crossway point are searched. Since no destination was entered from the start and in order to allow the user to choose a suitable target to go forward, it is possible to provide the scenic spots that the user may pass by while moving from the first crossway point to the second crossway point. Here, in STEP S15, it may optionally comprise allowing the user to input the scenic spot property intended to be displayed, e.g. restaurant or entertainment site, and then performing search operations based on the inputted scenic spot property, thereby offering more suitable information for the user;

Next, in STEP S16, the first crossway point, roads between the first crossway point and the at least one second crossway point as well as relevant information about the scenic spots acquired in search operations are displayed. Such relevant information may comprise the number of scenic spots found thereby.

Moreover, the route guiding method in accordance with the present invention may comprise, as required, recording the road chosen by the user to move along, and predicting the destination of the user in accordance with the road chosen by the user, thereby further providing more advanced information such as meteorological information, traffic information around the predicted destination or miscellaneous activity information and the like.

Figure 6:
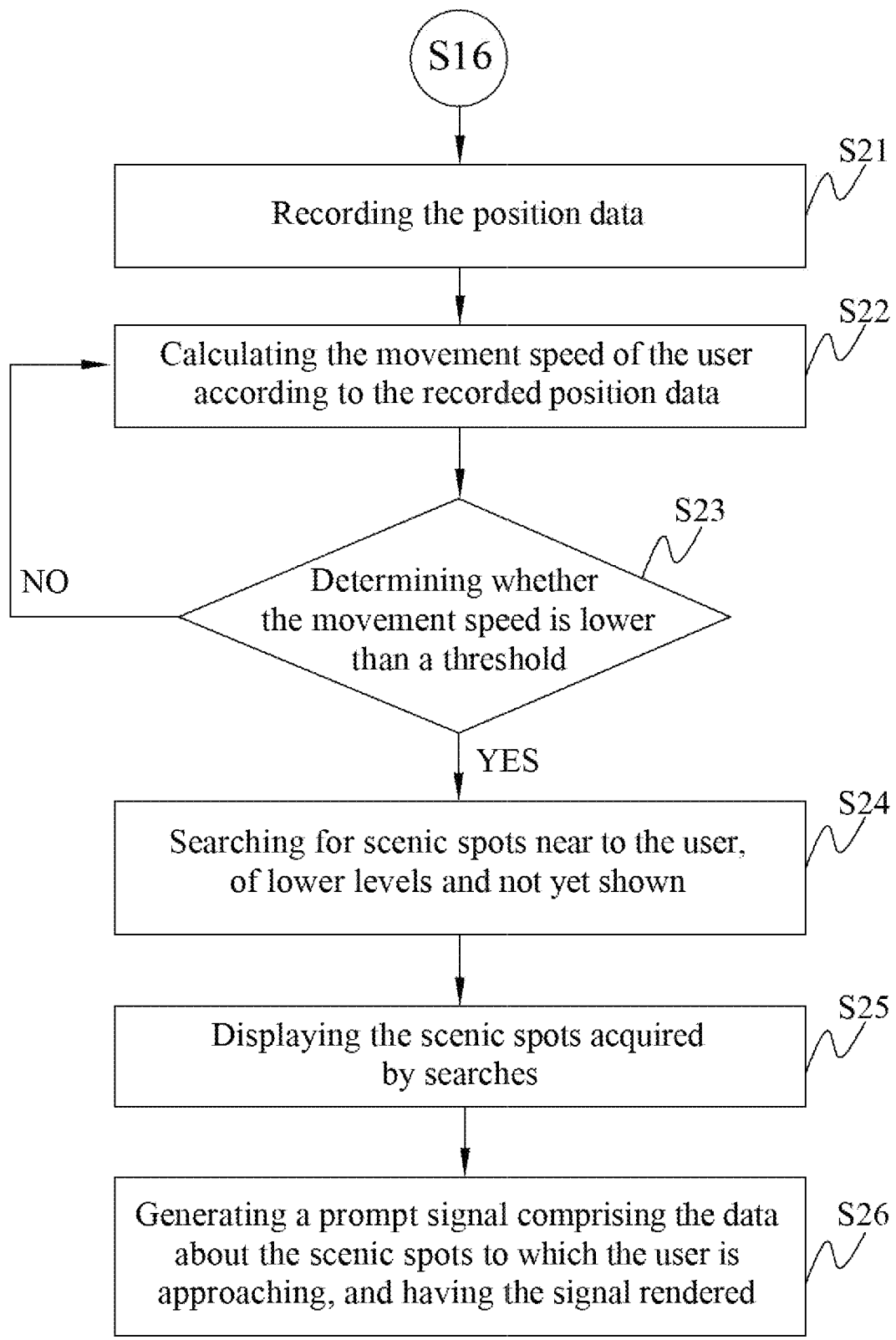
FIG. 6 is a flowchart of the scenic spot prompt in the route guiding method in accordance with an embodiment of the present invention.

Referring to FIG. 6, a flowchart of the scenic spot prompt in the route guiding method in accordance with an embodiment of the present invention is shown. In the Figure, different levels are recorded in the data of the scenic spots, and thus the route guiding method in accordance with the present invention can modify the displays of scenic spots based on the speed of the user, in which die present embodiment extends from the STEP S16 shown in FIG. 5, comprising the following steps. In STEP S21, position data are recorded; in STEP S22, the movement speed of the user is calculated according to the recorded position data; in STEP S23, whether the movement speed is lower than a threshold is determined; if not, then STEP S21 is performed. Otherwise, in case the movement speed is deemed to be lower than a threshold, then in STEP S24, the scenic spots which are near to the user, of lower levels and not shown in STEP S16 are searched. Next in STEP S25, the scenic spots acquired thereby are displayed. And subsequently in STEP S26, a prompt signal comprising die data about the scenic spots to which the user is approaching is generated, and thereby having the signal rendered.

The aforementioned descriptions are only exemplary, rather than being restrictive. All effectively equivalent modifications or changes made thereto without departing from the spirit and scope of the present invention should be deemed as being encompassed by the claims set forth hereinafter.

What is claimed is:

1. A route guiding system for guiding a user to select a movement path, the route guiding system comprising:
   a display module;
   a data storage module storing an electronic map and data concerning a plurality of scenic spots, the electronic map comprising data for a plurality of roads as well as a plurality of crossway points located between the plurality of roads, wherein each of those scenic spots is a general point of an interest or a spot where a scenery is visible;
   a positioning module providing position data of the user;
   a crossway point determining module determining whether the user is approaching to a first crossway point among the plurality of crossway points based on the position data and the electronic map, and in case the user is determined as getting near to the first crossway point, the crossway point determining module determines a plurality of second crossway points, each having a road connecting to the first crossway point; and
   a process module searching for the scenic spots located between the first crossway point and each of the second crossway points from the data storage module, and driving the display module to display the first crossway point, the roads between the first crossway point and each of the second crossway points as well as relevant information about the scenic spots found from the search results, wherein the process module records the position data, and calculates the movement speed of the user based on the recorded position data, the process module determines the number of scenic spots to be displayed based on the movement speed of the user, and guides the user to select the road between the first crossway point and one of the second crossway points as the movement path according to the number of scenic spots of each of the roads displayed, such that there is no need to preset a destination in the route guiding system.

2. The route guiding system according to claim 1, wherein the positioning module comprises a Global Positioning System (GPS) module, an electronic compass or a gyroscope.

3. The route guiding system according to claim 1, wherein the data of the scenic spots comprise names, properties or levels of the scenic spots.

4. The route guiding system according to claim 3, further comprising an input module for allowing the user to input the properties of the scenic spots to be displayed, and the process module performing search operations based on the properties of the scenic spots inputted by the user.

5. The route guiding system according to claim 1, wherein the relevant information about the searched scenic spots comprises the number of searched scenic spots.

6. The route guiding system according to claim 1, wherein the process module determines the scenic spot to which the user is approaching based on the position data, and generates a prompt signal comprising the data about the scenic spot to which the user is approaching.

7. The route guiding system according to claim 1, wherein the process module records the road chosen by the user to move along, and predicts a destination of the user based on the road chosen.

8. A route guiding method for guiding a user to select a movement path, the route guiding method comprising the following steps:
   providing an electronic map and data concerning a plurality of scenic spots, wherein each of those scenic spots is a general point of an interest or a spot where a scenery is visible;
   acquiring position data of the user by using a positioning module;
   determining whether the user is approaching a first crossway point in the electronic map;
   determining a plurality of second crossway points, each having a road connecting to the first crossway point based on the electronic map in case the user is determined as approaching the first crossway point;
   searching for the scenic spots located between the first crossway point and each of the second crossway points;

displaying the first crossway point, the roads between the first crossway point and each of the second crossway points, as well as relevant information about the scenic spots found from the search results;

recording the position data, and calculating the movement speed of the user based on the recorded position data;

determining the number of scenic spots to be displayed based on the movement speed of the user; and guiding the user to select the road between the first crossway point and one of the second crossway points as the movement path according to the number of scenic spots of each of the roads displayed, such that there is no need to preset a destination in the route guiding method.

9. The route guiding method according to claim 8, wherein the positioning module comprises a Global Positioning System (GPS) module, an electronic compass or a gyroscope.

10. The route guiding method according to claim 8, wherein the data of the scenic spots comprises names, properties or levels of the scenic spots.

11. The route guiding method according to claim 10, further comprising allowing the user to input the properties of the scenic spots to be displayed, and performing search operations based on the inputted properties of the scenic spots.

12. The route guiding method according to claim 8, wherein the relevant information about the searched scenic spots comprises the number of searched scenic spots.

13. The route guiding method according to claim 8, further comprising determining the scenic spot to which the user is approaching based on the position data, and generating a prompt signal comprising the data about the scenic spot which the user is approaching.

14. The route guiding method according to claim 8, further comprising recording the road chosen by the user to move along, and predicting a destination of the user based on the road chosen.

* * * * *